(12) United States Patent
Alexander et al.

(10) Patent No.: US 7,672,669 B2
(45) Date of Patent: Mar. 2, 2010

(54) METHOD AND APPARATUS FOR CONTROLLABLE SIMULATION OF MOBILITY

(75) Inventors: Thomas Alexander, Mulino, OR (US); L. Noel Stott, Aloha, OR (US)

(73) Assignee: VeriWave, Inc., Beaverton, OR (US)

( * ) Notice: Subject to any disclaimer, the term of this patent is extended or adjusted under 35 U.S.C. 154(b) by 844 days.

(21) Appl. No.: 11/488,396

(22) Filed: Jul. 18, 2006

(65) Prior Publication Data

US 2008/0020746 A1 Jan. 24, 2008

(51) Int. Cl.
*H04W 24/00* (2009.01)
(52) U.S. Cl. ............... 455/423; 455/67.11; 455/425
(58) Field of Classification Search ......... 455/423–425, 455/67.11–67.13, 69, 522; 370/318, 328, 370/338
See application file for complete search history.

(56) References Cited

U.S. PATENT DOCUMENTS

| | | | |
|---|---|---|---|
| 5,233,628 A | | 8/1993 | Rappaport et al. |
| 5,805,667 A | | 9/1998 | Alvarez et al. |
| 6,073,026 A | * | 6/2000 | Kim et al. ............ 455/522 |
| 6,148,194 A | | 11/2000 | Kao et al. |
| 6,154,638 A | | 11/2000 | Cheng et al. |
| 6,226,502 B1 | * | 5/2001 | Chung ............ 455/118 |
| 6,308,072 B1 | | 10/2001 | Labedz et al. |
| 6,603,822 B2 | | 8/2003 | Brede et al. |
| 6,724,730 B1 | | 4/2004 | Mlinarsky et al. |
| 6,728,259 B1 | | 4/2004 | Gronberg |
| 6,822,947 B2 | | 11/2004 | Sawyer et al. |
| 6,901,357 B1 | | 5/2005 | Patiejunas |
| 7,009,957 B2 | | 3/2006 | Wu et al. |
| 7,020,073 B2 | | 3/2006 | Kadous et al. |
| 7,024,219 B2 | | 4/2006 | Miyamoto |
| 7,035,594 B2 | | 4/2006 | Wallace et al. |
| 7,539,489 B1 | * | 5/2009 | Alexander ............ 455/423 |
| 2003/0092459 A1 | * | 5/2003 | Blessent ............ 455/522 |
| 2003/0148761 A1 | * | 8/2003 | Gaal ............ 455/423 |
| 2004/0209635 A1 | * | 10/2004 | Hsu et al. ............ 455/522 |
| 2006/0046710 A1 | * | 3/2006 | Lohlein et al. ............ 455/423 |
| 2006/0184707 A1 | * | 8/2006 | Lesartre ............ 710/306 |

* cited by examiner

*Primary Examiner*—Kamran Afshar
(74) *Attorney, Agent, or Firm*—Haynes and Boone, LLP

(57) ABSTRACT

Systems and methods enabling the efficient and repeatable simulation of mobility, during performance measurements of wireless data communications equipment are described. These are particularly useful for testing the impact on performance of spatial separation between Wireless Local Area Network (WLAN) devices, clients, relative to their counterparts, access points. In accordance with one or more embodiments of the present invention, the controlled emulation of spatial distance effects by injecting impairments into the transmitted and received wireless data packet streams are disclosed to simulate the impact of distance on properties of signal level, signal to noise ratio, and frame error ratio. Injection of impairments may be accomplished by varying the transmit power, artificially inducing errors into transmitted frames, and withholding acknowledgements for otherwise valid received frames, at levels consonant with the amount of distance to be emulated. This enables various mobility performance measurements to be made on WLAN devices without actually requiring that they be physically separated.

34 Claims, 8 Drawing Sheets

METHOD AND APPARATUS FOR CONTROLLABLE SIMULATION OF MOBILITY

TECHNICAL FIELD

The present invention generally relates to wireless data communications test and measurement, and, more specifically, to methods for controllably simulating mobility during performance measurements on wireless data communication devices.

BACKGROUND

Wireless Local Area Network (WLAN) equipment, such as clients and Access Points (APs), usually operate in an environment where the APs are fixed in location, but the client devices move about from place to place. Movement of a client device in this fashion causes changes in the performance of the link between the device and its associated AP. A client that is more distant from the AP may suffer from a loss in bandwidth and an increase in latency due to the decreasing signal strength. It is therefore of interest to quantify the performance of the WLAN devices in situations where they are mobile.

Further, the packetized data traffic that is transferred to or from such equipment over the Radio Frequency (RF) link is occasionally corrupted by errors. Such errors are commonly caused by random noise. In a situation with a high ambient noise level, for example, a very large proportion of the data transferred may be affected by such errors. It is therefore of interest when quantifying the performance of such equipment to determine how well it can function in the presence of frame errors.

Further, the incidence of errors may in fact change the functioning and internal state of WLAN equipment. For instance, an increasing level of frame errors may signal to a mobile WLAN client that it is moving away from the AP to which it is connected; basically, the increasing distance causes a decrease in the received signal strength, which in turn reduces the Signal to Noise Ratio (SNR) and thus increases the error rate. At a pre-set threshold of error rate, the client may elect to disconnect from the AP and seek out a new, closer AP to which it can connect, in the hope of decreasing its error rate. This process is referred to as roaming. It is therefore of interest to determine the behavior and performance of WLAN devices while they roam.

Additionally, the capacity of the physical link between a client and an AP is affected by the error ratio. The physical link is established by two radio transceivers, one in the client and one in the AP. The radio transceivers in WLAN equipment are typically capable of using different modulation schemes having different intrinsic bit rates and different SNR tolerances. If a client or AP finds that the modulation scheme it is currently using is leading to an excessive rate of frame errors, it may elect to drop down to a lower-rate modulation scheme that has a higher SNR tolerance in order to try to reduce the frame error ratio. This process is referred to as rate adaptation. Obviously, the use of a modulation scheme with a lower intrinsic bit rate will lead to a drop in data transfer performance between the client and AP; it is therefore of interest to quantify this performance.

In a physical sense, all of these relate to the need for WLAN equipment to operate with a spatial distance between them. If the equipment were statically located in close proximity, they would receive signals with a high signal strength (relative to the ambient noise level) and would therefore suffer a low rate of errors. Also, there would be no need for a client to roam to a new AP. However, the prime characteristic of WLAN equipment being the support of mobility, it is necessary for them to operate at substantial distances from each other. Increasing distance leads to an attenuation of the RF signal, a reduction in received signal strength, and a consequent increase in frame errors.

Two principal metrics have been used to quantify the mobility performance of WLAN equipment. The first is commonly known as the rate versus range performance metric, and consists of measuring the data transfer performance as a function of distance. The second is known as the roaming performance metric, and consists of observing the behavior and performance of a WLAN system when a client roams from one AP to another; roaming occurs when the RF signal level and the incidence of frame errors rises above some threshold.

Heretofore, the measurement of the mobility performance of WLAN equipment has been performed by introducing an actual attenuation of the RF signal between two pieces of WLAN equipment to induce the effects described above, and then measuring performance according to the desired metric. The approaches that have been implemented to date to perform such measurements include:

(a) Placing the WLAN equipment (both real clients and real APs) within a large physical space, and then physically moving the devices in order to increase or decrease the distance between them. Thus the rate versus range metric can be measured by measuring the data transfer rate of the WLAN equipment at different physical distances from each other, and the roaming metric can be obtained by observing the behavior of the WLAN clients and APs as the relative distances between them change. Unfortunately, this method requires a large floor space, is highly labor-intensive, subject to variations due to human error, and is prone to interference and external signals. It is thus neither cost-effective nor repeatable. It is also very difficult to predict or control the level of signal and the amount of frame errors that will be induced during the test. It is thus unsuitable for tests involving controllable frame error ratios.

(b) Placing the WLAN equipment (again, real clients and Teal APs) into separate shielded chambers that are interconnected by means of variable RF attenuators. Increasing the amount of attenuation simulates the increase of distance between the WLAN equipment; conversely, decreasing the amount of attenuation simulates a decreasing distance. This approach avoids most of the problems of the first mentioned method; it can be automated and is relatively efficient. Further, it affords some degree of control of the frame errors and signal levels. However, it suffers from unpredictable variations due to the manufacturing tolerances of the client and AP radio transceivers. Also, it relies on the use of both clients and APs in the same test; as the characteristics of both such equipment are widely variable, this method forces the user to test every combination of client and AP in order to quantify just the performance of, for instance, the AP. Finally, the level of frame errors that are produced cannot be easily predicted, but must be experimentally measured. It would be much preferred to replace one side of the WLAN link (i.e., either the client or the AP) with a piece of dedicated WLAN test equipment, and test the other side of the WLAN link (i.e., the AP or client, respectively) without being subject to manufacturing tolerances.

Accordingly, there is a need for improved systems and methods for enabling the efficient measurement of the mobility performance of WLAN equipment. Further, there is a need for methods for controllably simulating distance between a WLAN device and a WLAN tester without being subject to RF noise or manufacturing tolerances. Further, there is a need for systems and methods for controlling the effective frame error ratio introduced into a WLAN link (in either receive or transmit directions, or both) without the use of RF attenuators.

SUMMARY

In accordance with one or more embodiments of the present invention, methods and apparatus are provided for enabling the measurement of the mobility performance of wireless data equipment, comprising a WLAN tester unit possessing means for controlling the power of transmitted data packets, as well as means for simulating errors in data packets.

In accordance with one embodiment, the WLAN tester contains: a test port controller for general control of the tester; Medium Access Control (MAC) logic for implementing the MAC functionality of the wireless data protocol; transmit frame error injection logic operatively coupled to said MAC logic, to emulate transmit RF signal-to-noise (SNR) issues caused by distance; receive frame error injection logic operatively coupled to said MAC logic, to emulate received RF SNR issues caused by distance; transmit and receive baseband functions for modulation and demodulation; RF upconversion and downconversion functions for frequency translation and filtering; a transmit power control function for emulating the variation in signal strength caused by distance; amplifiers for transmit and receive amplification; and transmit/receive switching functions to enable the WLAN tester to transmit to or receive from the device under test (DUT).

The test port controller may preferably be operative to communicate with, receive commands from, and send measurements to, a central controller that controls and coordinates the activities of the WLAN tester in conjunction with the remainder of the test setup.

The MAC logic may preferably be operative to generate WLAN data frames to be transmitted to the DUT, and to process WLAN data frames received from the DUT, in such a way that the desired WLAN MAC protocol functions are implemented.

The transmit frame error injection logic may preferably be operative to detect the impending transmission of a frame to the DUT by the MAC logic, to perform a frame error ratio calculation according to the number of packets transmitted and the desired transmit frame error probability, and to signal the MAC logic to artificially induce a frame error in the frame prior to transmission.

The receive frame error injection logic may preferably be operative to detect the reception of a frame from the DUT by the MAC logic, to perform a frame error ratio calculation according to the number of packets transmitted and the desired receive frame error probability, and to signal the MAC logic to artificially indicate a received frame error to the DUT.

The transmit baseband function may preferably implement the modulation functions that is required for encoding WLAN packets at the baseband level prior to RF processing and transmission.

The receive baseband function may preferably implement the demodulation function that is required for decoding received WLAN packets to the baseband level subsequent to RF processing.

The transmit RF upconversion function may preferably be operative to translate the modulated baseband signal to the desired RF channel prior to transmission.

The receive RF downconversion function may preferably be operative to translate the received signal in the desired RF channel to baseband prior to demodulation.

The transmit power control function may preferably be operative to vary the average RF transmit power of the transmitted WLAN packets prior to their transmission to the DUT, in order to control the effective signal strength of the packets received by the DUT from the WLAN tester.

The transmit amplifier may preferably be operative to boost the power of the signal transmitted by the WLAN tester to the level required for reception by the DUT.

The receive amplifier may preferably be operative to boost the power of the signal received by the WLAN tester from the DUT to the level required by the RF downconverter.

Advantageously, frame errors may be injected into the transmitted MAC channel by corrupting the Frame Check Sequence (FCS) field of the MAC frames prior to transmission.

Advantageously, frame errors may be injected into the received MAC channel by withholding Acknowledgement (ACK) frames, which are sent to the DUT in response to normal MAC data frames as part of the normal WLAN MAC protocol.

Advantageously, the transmit and receive frame error injection logic may employ a random number generator, comparator and register, to enable the frame error rate to be randomized but yet controlled according to a pre-set frame error probability.

Advantageously, the transmit power control function may utilize a variable RF attenuator operatively coupled to a transmit power level register, to enable the transmitted power level to be controlled according to a pre-set transmit power level.

Advantageously, the variable RF attenuator may be a digitally controlled attenuator such that transmit power may be varied in discrete and predetermined steps.

Advantageously, the transmitted power and frame error ratios may be varied on a packet-by-packet basis, to emulate the effect of variations in distance caused by motion.

BRIEF DESCRIPTION OF THE DRAWINGS

The description of the embodiments is taken in conjunction with the accompanying drawings, wherein.

DETAILED DESCRIPTION

Figure 1:
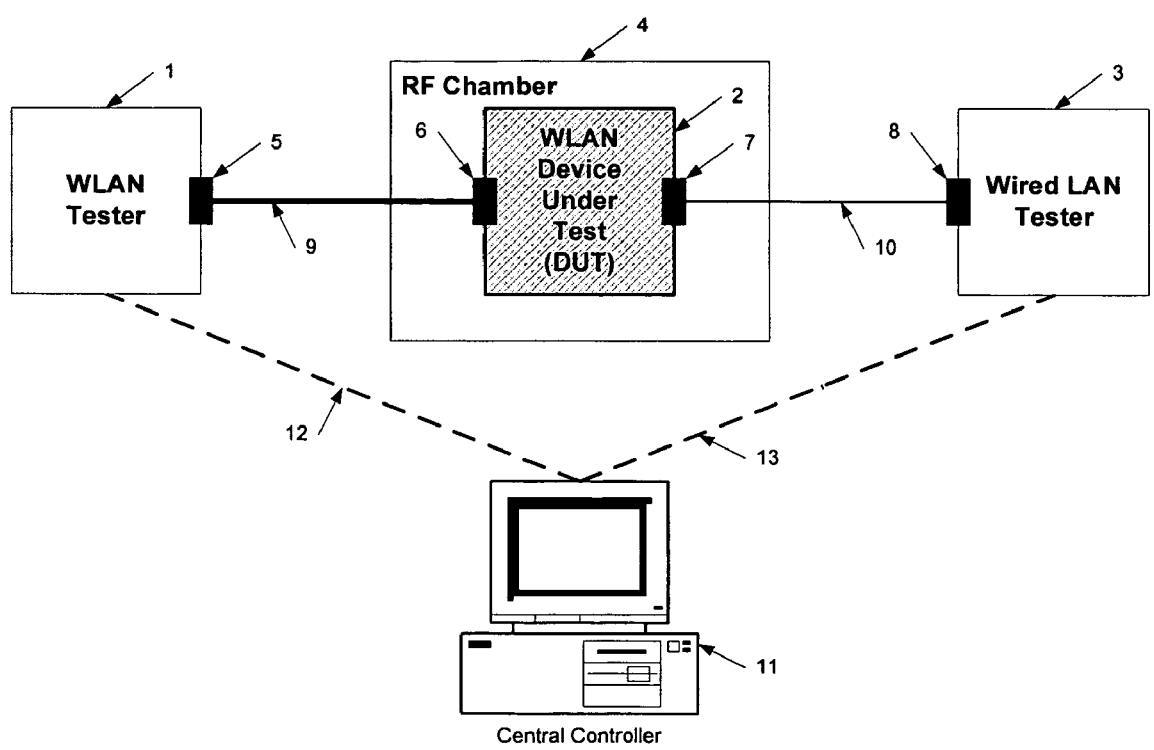
FIG. 1 is a diagram illustrating the general arrangement of an exemplary test system for testing a WLAN device having a wireless interface and a wired interface in accordance with an embodiment of the present invention.

With reference to FIG. 1, the general arrangement of a system for testing a Wireless LAN (WLAN) Device Under Test (DUT) 2 preferably comprises a WLAN tester 1, wired LAN tester 3, and central controller 11, interconnected by cables 9, 10, 12 and 13. The DUT may preferably be placed within RF chamber 4, the purpose of which is to isolate the DUT from external interference and prevent its radiated emissions from interfering with external devices. Cable 9 is preferably an RF coaxial cable or waveguide that is connected between RF connector 5 of WLAN tester 1 and an antenna connector 6 of DUT 2. Cable 10 is preferably a twisted-pair or optical fiber cable that connects a wired interface 7 of DUT 2 to wired interface 8 of wired LAN tester 3. Cables 12 and 13 may preferably be LAN or control cables that interconnect central controller 11 with WLAN tester 1 and wired LAN tester 3, respectively.

During the conduct of a performance or functional test on DUT 2, wireless data signals are transmitted and received by WLAN tester 1 via cable 9, and wired data signals may preferably be transmitted and received concurrently by wired LAN tester 3 via cable 10. Measurements are made on the responses of DUT 2 to these signals, and the results may preferably be recorded as the characteristics of DUT 2. Cable 9 may be of a fixed and predetermined length; however, any desired distance between WLAN tester 1 and DUT 2 may be emulated by means of the methods described herein.

It is understood that a plurality of WLAN and wired LAN tester units may be used in a single test setup, depending on the number of wireless interfaces 6 and wired interfaces 7 possessed by DUT 2. One tester unit of the corresponding type is preferably used for each interface of DUT 2. It is further understood that a reference to an aspect of WLAN tester 1 or wired LAN tester shall hereinafter be taken to apply to all other instances of WLAN or wired LAN tester units that may be present in the system.

Central controller 11 preferably communicates with WLAN tester unit 1 and wired LAN tester unit 3 to control and coordinate their activities and conduct performance or functional tests desired by the user of the test system. Central controller 11 preferably utilizes a standard host computer or workstation, such as a personal computer, and performs user-interface, control, results processing and results display functions. A comprehensive control and analysis program may be implemented on central controller 11 in order to control and coordinate the tester units and analyze the data that they collect. User control of the tester units is preferably accomplished through a Graphical User Interface (GUI), which performs user interface functions, including such elements as providing the user with access to frame error rate, power or distance simulation parameters, and the ability to format and output reports based on data gathered by the tester units and processed by central controller 11.

Figure 2:
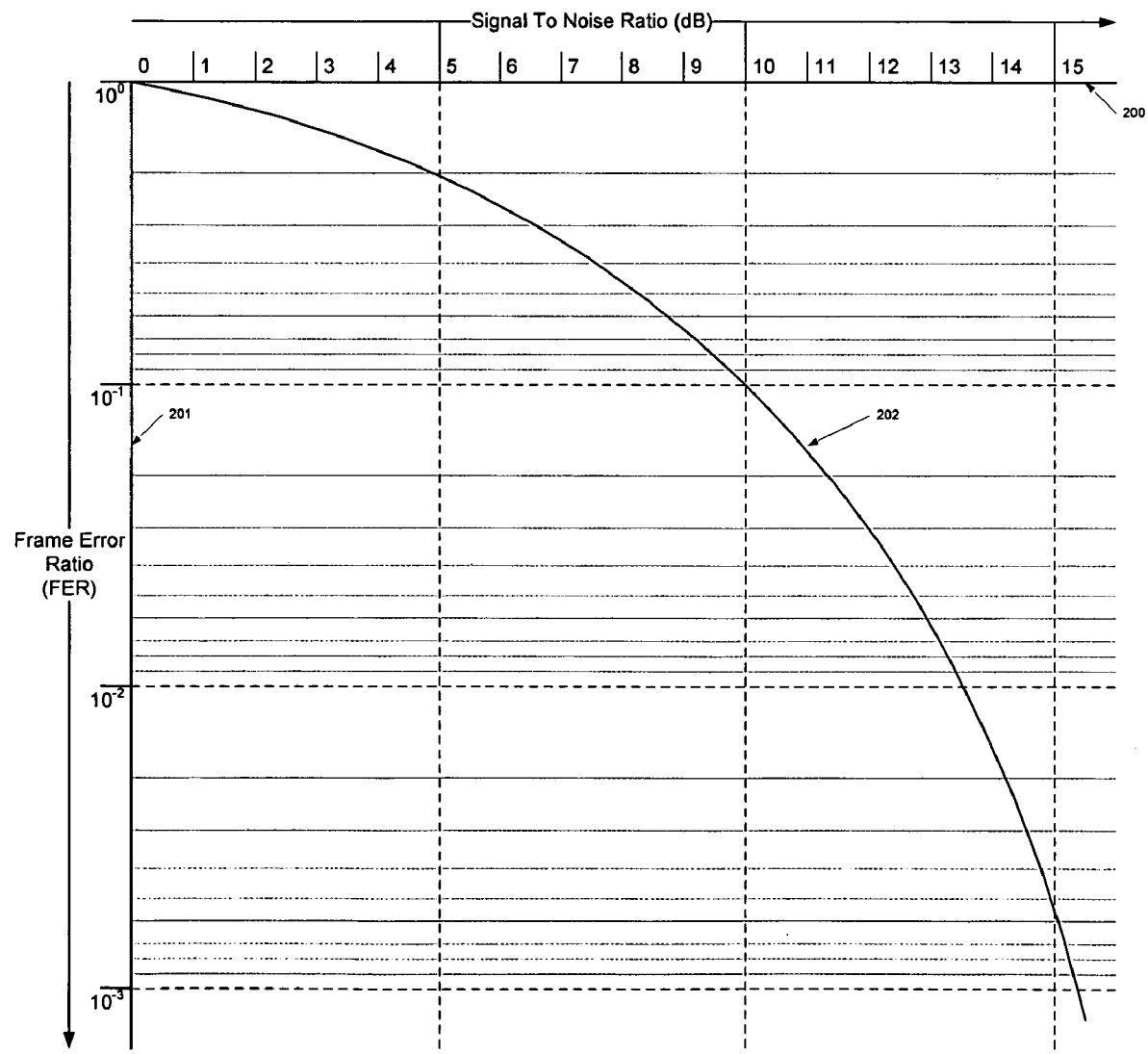
FIG. 2 is a representation of an exemplary relationship between injected packet errors and the resulting inferred signal to noise ratio that may be obtained using the WLAN tester unit in accordance with an embodiment of the present invention.

With reference to FIG. 2, an example of a relationship 202 between frame error ratio (FER) and SNR is depicted in graphical form. It is understood that this is an exemplary representation for the purposes of discussion. The actual relationship between FER and SNR for a specific instance of DUT 2 is dependent on the properties of the DUT as well as the modulation format used.

The horizontal axis 200 represents increasing SNR, while the vertical axis 201 represents a decreasing FER. The curve 202 represents the relationship between a given SNR and the equivalent FER, and vice versa. It will be apparent that for any given DUT 2 a specific SNR may be emulated by imposing a corresponding level of FER. The SNR in turn varies according to the distance between a wireless transmitter and wireless receiver, and may be predicted by the use of standard propagation models that are well known in the prior art. It is therefore apparent that the effects of distance may be emulated by adjusting the transmit power, the effective FER, or both.

Figure 3:
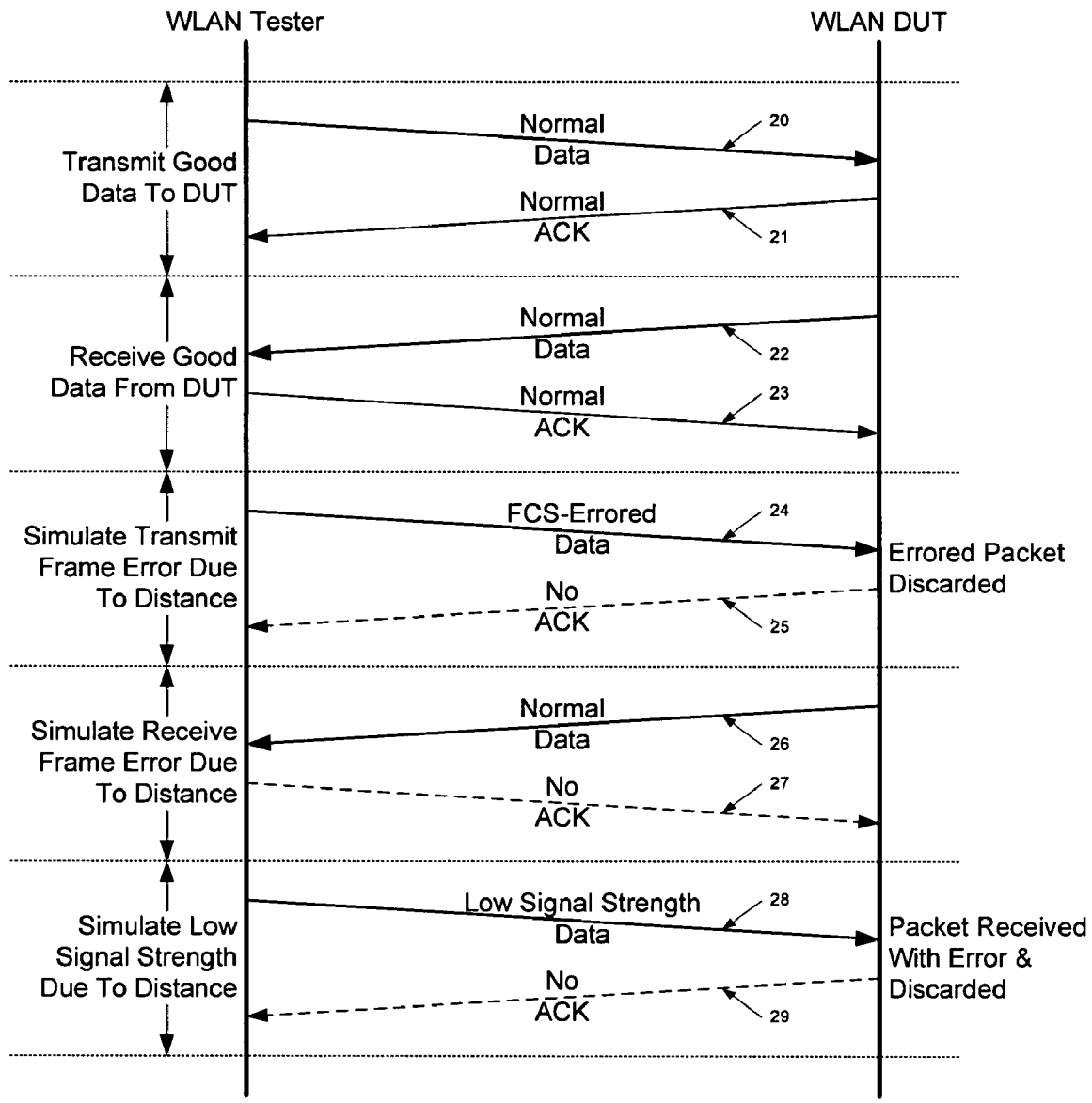
FIG. 3 is a representation of the various wireless protocol transactions wherein errors may be introduced to emulate the effect of distance and mobility in accordance with one or more embodiments of the present invention.

With reference to FIG. 3, a series of normal and errored (impaired) data transactions performed between WLAN tester unit 1 and DUT 2, according to a wireless LAN data protocol such as the IEEE Std 802.11 wireless LAN data protocol, are depicted as a protocol ladder diagram. A normal data transfer from WLAN tester 1 to DUT 2 may involve the transmission of a data packet at step 20 from WLAN tester 1, its reception without errors by DUT 2, the transmission of an acknowledgement (ACK) packet at step 21, and its reception without errors by WLAN tester 1. Similarly, a normal data transfer from DUT 2 to WLAN tester 1 may involve the transmission of a data packet at step 22 from DUT 2 and the transmission of an ACK packet at step 23 from WLAN tester 1.

The failure to receive an ACK packet is normally an indication to the transmitter of a data packet that the data packet was corrupted by noise and therefore lost or discarded by the receiver. As the distance between the transmitter and receiver increase, therefore, the received signal strength falls relative to the ambient noise level, and the incidence of lost data packets increases. This is referred to as a channel impairment. The emulation of this process is illustrated in steps 24, 25, 26, 27, 28, and 29 of FIG. 3.

The Frame Check Sequence (FCS) field within a WLAN data packet is normally used by a WLAN receiver to determine if a packet has been corrupted by noise or not. The generation of a data packet that is corrupted by noise may advantageously be emulated by WLAN tester 1 in step 24 by deliberately modifying the FCS field of the packet prior to transmission, such that DUT 2 fails to calculate a valid FCS and regards the data packet as having been corrupted by noise. In this case DUT 2 will hence fail to return an ACK packet to WLAN tester 1, as indicated by step 25.

The receipt of an ACK packet in response to a previously transmitted WLAN data packet is normally used by a WLAN transmitter to determine if the intended WLAN receiver had successfully received the data packet, or if the data packet had been corrupted by noise. The reception of a data packet that is corrupted by noise or other channel impairment may advantageously be emulated by WLAN tester 1 in step 26 by deliberately failing to return an ACK packet, as indicated by step 27. DUT 2 will hence treat the recently transmitted data packet as having been lost. This process is hereinafter referred to as ACK withholding.

The signal strength of received data packets, preferably relative to the ambient noise level, may be used by WLAN devices to estimate the distance to their counterparts. Furthermore, a decreasing signal strength results in a decreasing SNR and therefore an increase in the frame error ratio (FER). This channel impairment may advantageously be emulated by WLAN tester 1 in step 28 by transmitting a data packet at a low transmit power level. This is received with a reduced SNR by DUT 2 and interpreted as an increased distance from WLAN tester 1; in fact, at a sufficiently low SNR the data packet may be corrupted with errors by random RF noise and lost, with no ACK being returned, as indicated by step 29.

The emulation of distance between WLAN tester unit 1 and DUT 2 may therefore be performed by implementing one or more of the artificial error injection and signal strength reduction effects described above to simulate channel impairments, and may preferably be carried out by implementing all three. An increase in distance may be emulated by increasing the level to which these channel impairments are applied. The limit of the range of the WLAN devices may be emulated when the transmitted signal from WLAN tester 1 is of minimum amplitude, all packets are received by DUT 2 with errors, and WLAN tester 1 returns no ACK packets to DUT 2 at all. Conversely, the minimum possible distance is emulated when all packets are transferred successfully in both directions, and the signal level is the maximum level acceptable to DUT 2.

Figure 4:
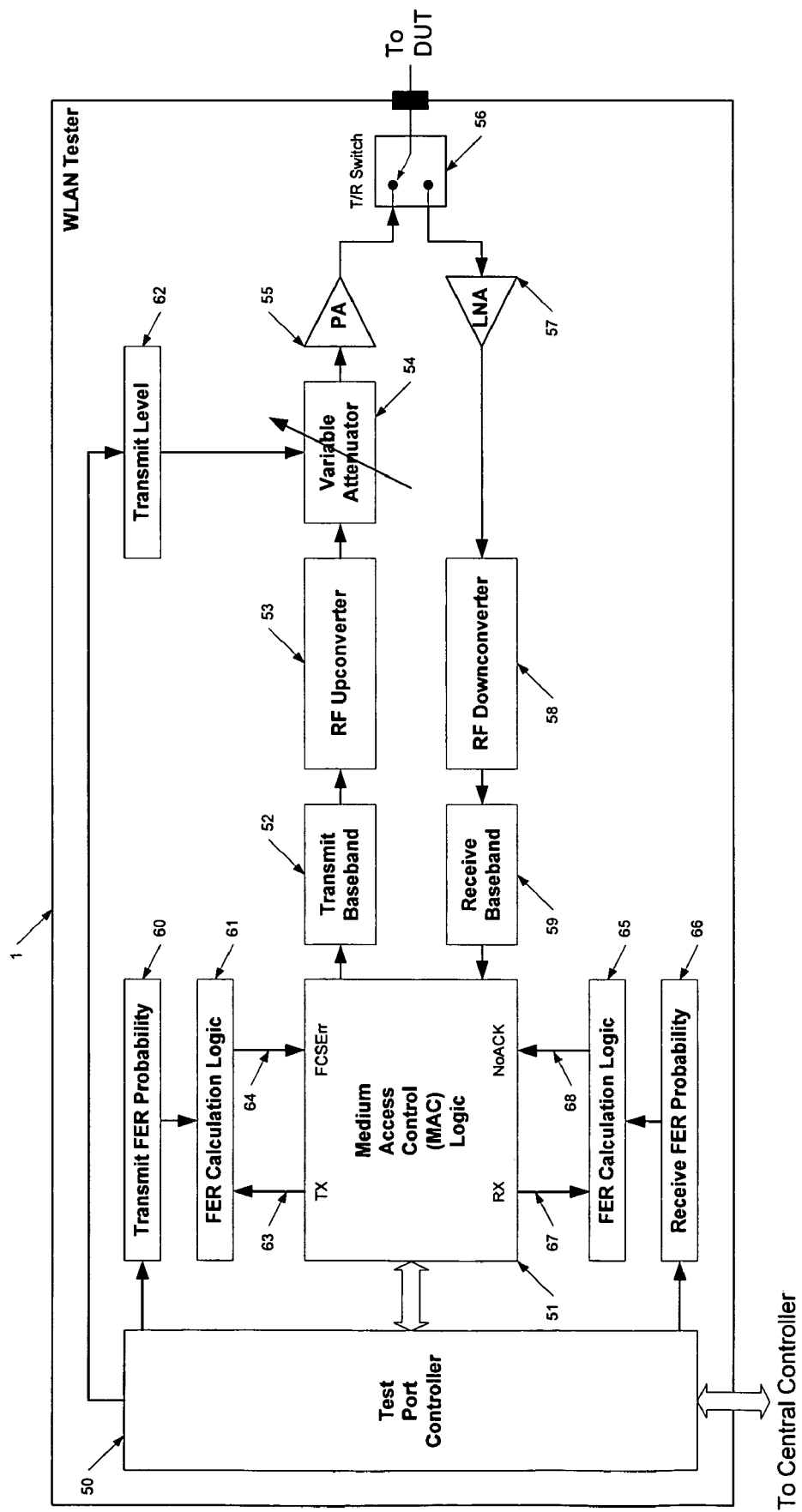
FIG. 4 is a schematic block diagram of the WLAN tester unit in accordance with one or more embodiments of the present invention.

With reference to FIG. 4, an exemplary implementation of WLAN tester unit 1, in accordance with one or more embodiments of the present invention, preferably comprises test port controller 50, which performs overall control of the unit and communicates with central controller 11; Medium Access Control (MAC) logic 51 coupled to test port controller 50 that implements the MAC or link layer functions required by the WLAN data transfer protocol, generates packets to be transmitted, processes received packets and injects errors as required to emulate distance; transmit baseband function 52 and receive baseband function 59, both of which are operatively coupled to MAC logic 51, and perform modulation and demodulation functions respectively; RF upconverter 53, which is operatively coupled to transmit baseband 52, and performs frequency translation (up-conversion) and filtering to the desired RF communications channel; variable attenuator 54, which may advantageously be a digitally controlled attenuator, operatively coupled to RF upconverter 53; linear power amplifier (PA) 55; transmit/receive (T/R) switch 56, which is operative to connect PA 55 to the WLAN tester DUT interface, and to connect the DUT interface to LNA 57; Low Noise Amplifier (LNA) 57; and RF downconverter 58, which performs frequency translation (down-conversion), Automatic Gain Control (AGC) and filtering functions. In addition, WLAN tester unit 1 preferably contains transmit FER probability register 60, transmit FER calculation logic 61, receive FER probability register 66, receive FER calculation logic 65, and transmit level register 62. Test port controller 50 controls the operation of MAC logic 51, transmit FER probability register 60, transmit level register 62, and receive FER probability register 66.

For brevity, the transmit portion of MAC logic 51, transmit baseband 52, RF upconverter 53, variable attenuator 54, PA 55 the transmit portion of T/R switch 56, transmit FER probability register 60, transmit FER calculation logic 61 and transmit level register 62 may collectively be referred to as the packet transmission datapath; while the receive portion of T/R switch 56, LNA 57, RF downconverter 58, receive baseband 59, the receive portion of MAC logic 51, receive FER probability register 66, and receive FER calculation logic 65 may collectively be referred to as the packet reception datapath.

The function of transmit FER calculation logic 61 is preferably to receive notification via transmit indication signal 63 of a frame about to be transmitted by MAC logic 51, determine whether the frame should be artificially corrupted according to the setting of transmit FER probability register 60, and indicate to MAC logic 51 whether or not to corrupt the frame prior to transmission by FCS error indication signal 64. It is preferable to corrupt the frame by modifying the FCS field in the frame to an invalid value; but it will be apparent that alternate methods of corrupting the frame, such as inverting bits in the header or payload, may be used to give the same result. Such methods are well known in the prior art and will not be described further.

The function of receive FER calculation logic 65 is preferably to receive notification via receive indication signal 67 of a frame that has just been received by MAC logic 51, determine whether the frame should be treated as being corrupted by noise (and therefore discarded) according to the setting of transmit FER probability register 66, and indicate to MAC logic 51 whether or not to treat the frame as being errored via no-ACK indication signal 68. Preferably, the indication of such an artificially-errored frame to DUT 2 may be done by withholding the ACK packet that is normally transmitted in response to a valid received frame.

The function of variable attenuator 54 is preferably to vary the power level of the data packets transmitted by WLAN tester 1 to DUT 2 responsive to the setting of transmit level register 62. A digital-to-analog converter may be used to convert the digital data written to transmit level register 62 into an analog voltage, which is then used to control the attenuation level of variable attenuator 54. In accordance with some embodiments, variable attenuator 54 may be placed between the RF upconverter 53 and PA 55 so as to vary the drive level to PA 55 and thereby linearly vary the output power of PA 55, in turn controlling the signal level of the transmitted packets. It will be apparent that alternate means of controlling the signal level of the packets may also be used, such as controlling the bias to PA 55 or by digital means in transmit baseband 52. Such methods are well known in the prior art and will not be described further.

Figure 5:
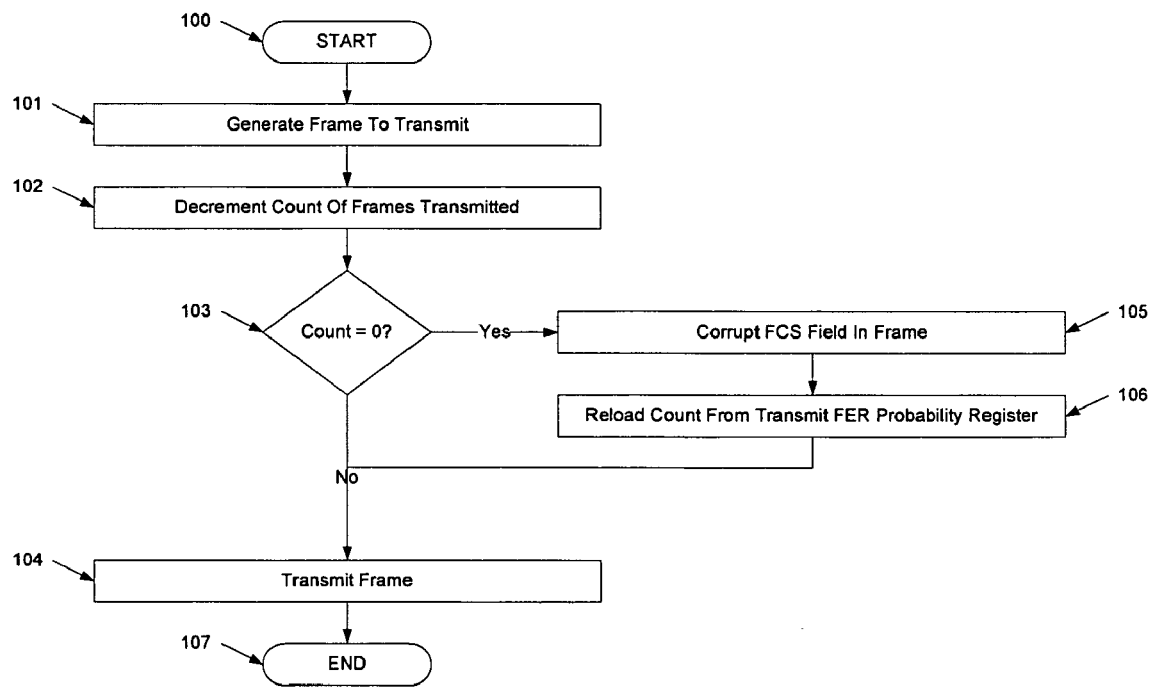
FIG. 5 is a representation of the method used to simulate errors in transmitted frames in accordance with one embodiment of the WLAN tester unit.

In accordance with an embodiment of WLAN tester 1, the corruption of FCS fields in transmitted frames to emulate decreasing SNR may take place at regular intervals as frames are transmitted from WLAN tester 1 to DUT 2. Transmit FER probability register 60 may preferably hold the interval between frames with artificially corrupted FCS fields. With reference to FIG. 5, the process of corrupting FCS fields in transmitted frames at regular intervals according to the setting of transmit FER probability register 60 may preferably comprise the steps of:

(a) at step 100, beginning the process upon receiving a transmit frame notification;

(b) at step 101, generating a MAC frame to be transmitted (with a valid FCS);

(c) at step 102, decrementing a count of consecutive frames to be transmitted before FCS corruption must occur;

(d) at step 103, determining if the count has gone to zero;

(e) at step 105, if the count has gone to zero, then corrupting the FCS field in the transmitted frame;

(f) at step 106, reloading the count of frames from the contents of transmit FER probability register 60;

(g) at step 104, transmitting the frame as so far processed; and (h) at step 107, terminating the process until the next transmit frame notification.

Figure 6:
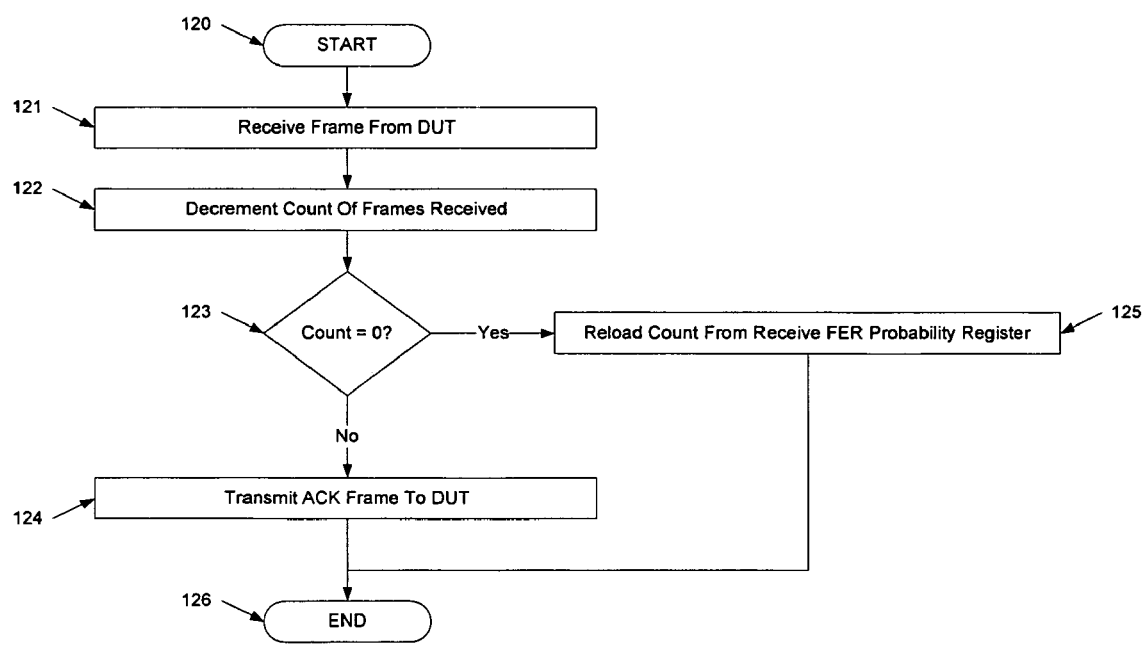
FIG. 6 is a representation of the method used to simulate errors in received frames in accordance with one embodiment of the WLAN tester unit.

In accordance with an embodiment of WLAN tester 1, the withholding of ACK frames returned to DUT 2 to emulate decreasing SNR may take place at regular intervals as frames are received by WLAN tester 1 from DUT 2. Receive FER probability register 66 may preferably hold the interval between frames for which ACKs must be withheld. With reference to FIG. 6, the process of withholding ACKs for received frames at regular intervals according to the setting of receive FER probability register 66 may preferably comprise the steps of:

(a) at step 120, beginning the process upon receiving a receive frame notification;

(b) at step 121, receiving a valid MAC frame from the DUT;

(c) at step 122, decrementing a count of consecutive frames to be received before ACK withholding must occur;

(d) at step 123, determining if the count has gone to zero;

(e) at step 125, if the count has gone to zero, then reloading the count of frames from the contents of receive FER probability register 66, but not transmitting an ACK frame;

(f) at step 124, if the count has not gone to zero, transmitting an ACK frame; and (g) at step 126, terminating the process until the next received frame.

Figure 7:
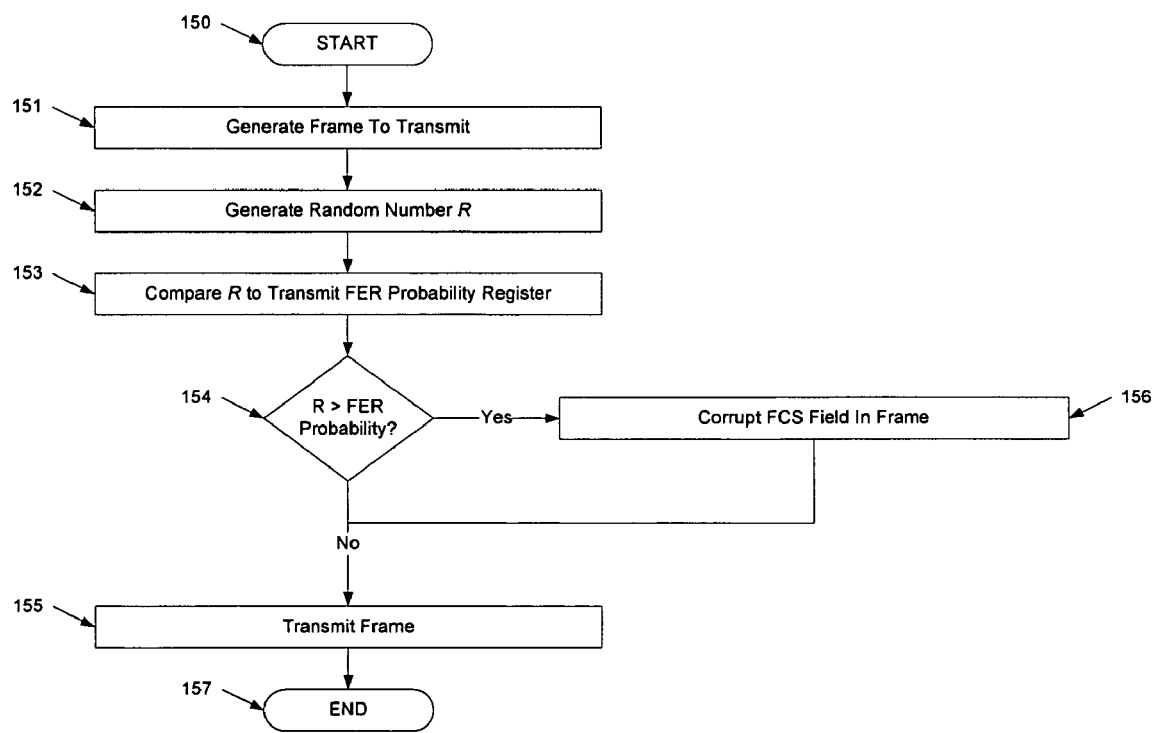
FIG. 7 is a representation of the method used to simulate errors in transmitted frames in accordance with another embodiment of the WLAN tester unit.

In accordance with another embodiment of WLAN tester 1, the corruption of FCS fields in transmitted frames to emulate decreasing SNR may take place in a random and probabilistic manner as frames are transmitted from WLAN tester 1 to DUT 2, so as to better emulate the incidence of corrupted frames in actual networks. Transmit FER probability register 60 may preferably hold the probability of frames being transmitted with artificially corrupted FCS fields. With reference to FIG. 7, the process of corrupting FCS fields in transmitted frames on a probabilistic basis according to the setting of transmit FER probability register 60 may preferably comprise the steps of:

(a) at step 150, beginning the process upon receiving a transmit frame notification;

(b) at step 151, generating a MAC frame to be transmitted (with a valid FCS);

(c) at step 152, generating a random number R in the range 0 to M, where M is the maximum possible value that can be loaded into transmit FER probability register 60;

(d) at step 153, comparing R to the contents of transmit FER probability register 60;

(e) at step 154, determining if R is greater than the contents of transmit FER probability register 60;

(f) at step 156, if R is greater, then corrupting the FCS field in the transmitted frame;

(g) at step 155, transmitting the frame as so far processed; and (h) at step 157, terminating the process until the next transmit frame notification.

Figure 8:
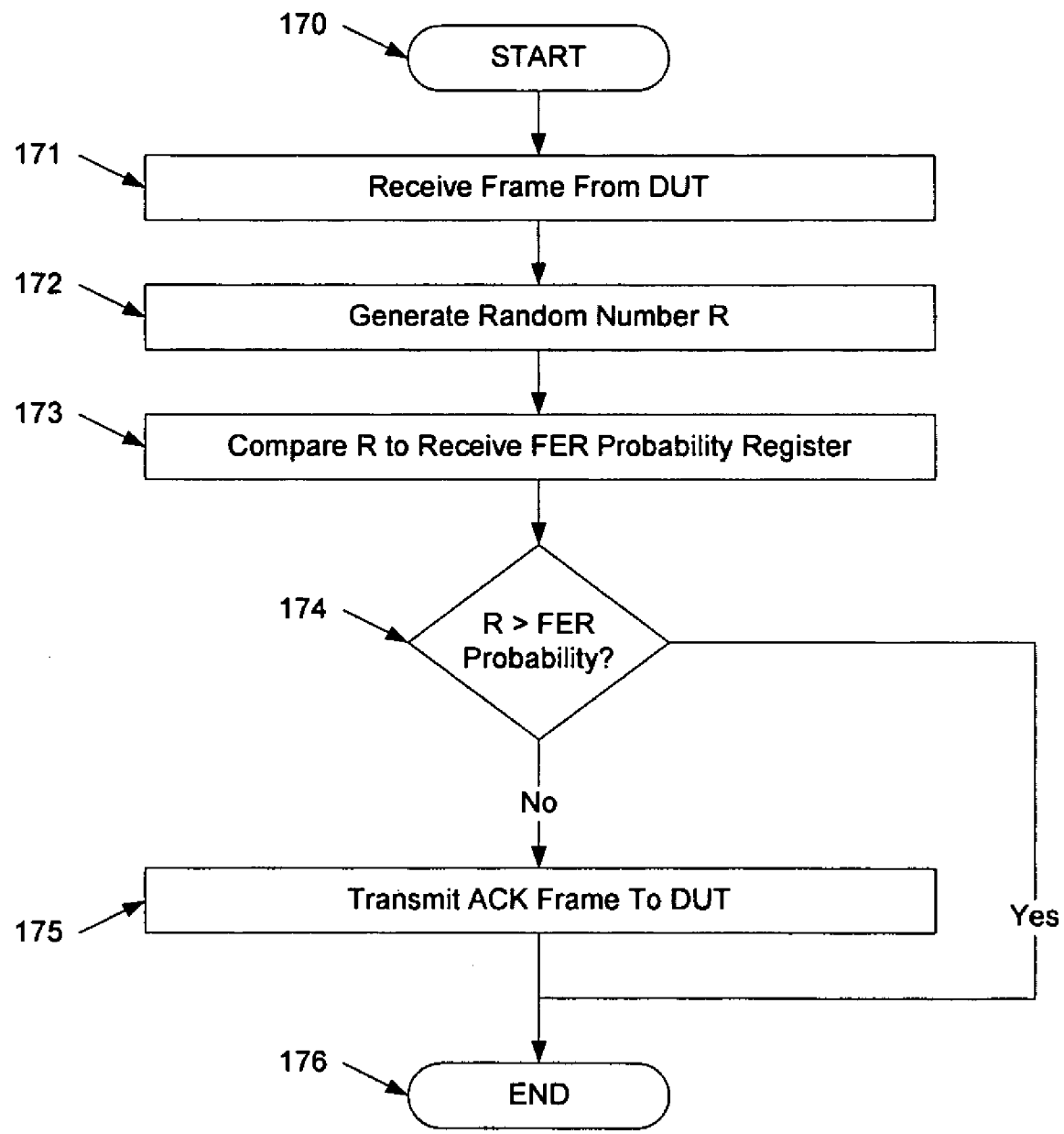
FIG. 8 is a representation of the method used to simulate errors in received frames in accordance with another embodiment of the WLAN tester unit.

In accordance with another embodiment of WLAN tester 1, the withholding of ACK frames returned to DUT 2 to emulate decreasing SNR may take place in a random and probabilistic manner as frames are received by WLAN tester 1 from DUT 2, so as to better emulate the incidence of corrupted frames in actual networks. Receive FER probability register 66 may preferably hold the probability of regarding valid received frames as being corrupted with noise due to low SNR. With reference to FIG. 8, the process of withholding ACKs for received frames on a probabilistic basis according to the setting of receive FER probability register 66 may preferably comprise the steps of:

(a) at step 170, beginning the process upon receiving a receive frame notification;

(b) at step 171, receiving a valid MAC frame from the DUT;

(c) at step 172, generating a random number R in the range 0 to M, where M is the maximum possible value that can be loaded into receive FER probability register 66;

(d) at step 173, comparing R to the contents of receive FER probability register 66;

(e) at step 174, determining if R is greater than the contents of receive FER probability register 66, and skipping the ACK transmission if so;

(f) at step 175, if R is not greater, transmitting an ACK frame; and (g) at step 176, terminating the process until the next received frame.

In another embodiment of the present invention, variable attenuator 54 may be replaced by a digital step attenuator. This eliminates the digital-to-analog converter and directly uses the digital data in transmit level register 62 to select the attenuation level in discrete steps. This enables a reduction in the overall cost and size of WLAN tester unit 1.

In another embodiment of the present invention, transmit FER probability register 60 and transmit FER calculation logic 61 may preferably be omitted. In this case, variable attenuator 54 in conjunction with transmit level register 62 provides the sole means of emulating distance by varying the signal strength (and thereby the perceived SNR) of the transmitted signal sent to DUT 2. Frame errors in transmitted frames occur as a natural consequence of a reduction in SNR, relative to the sensitivity and noise figure of the RF receiver in DUT 2. This eliminates the ability to induce frame errors at a predefined level, but also enables a reduction in the overall cost and size of WLAN tester unit 1.

In another embodiment of the present invention, variable attenuator 54 and transmit level control 62 may preferably be omitted. In this case, transmitted signals from WLAN tester 1 are received by DUT 2 with constant power, but with a greater or lesser incidence of frame errors as determined by transmit FER probability register 60 in conjunction with transmit FER calculation logic 61. This eliminates the ability to simulate the effect of distance by varying the received signal strength at DUT 2, but retains the ability to control the FER in the transmit direction and also enables a reduction in the overall cost and size of WLAN tester unit 1.

In another embodiment of the present invention, test port controller 50 may be directly responsive to mobility emulation commands from central controller 11, and manipulate the contents of transmit FER probability register 60, receive FER probability register 66 and transmit level register 62 in a simultaneous and progressive manner to emulate the effect of increasing or decreasing distance while WLAN data packets are being received from or transmitted to DUT 2. Advantageously, this capability may be used to emulate mobility.

In another embodiment of the present invention, test port controller 50 may modify the contents of transmit FER probability register 60 and transmit level register 62 on a packet-by-packet basis, so as to provide for the effect of different consecutive packets appearing to arrive at DUT 2 from different distances. Advantageously, this capability may be used to emulate multiple WLAN clients being located at different distances.

In another embodiment of the present invention, test port controller 50 may parse the contents of the headers of MAC packets received from DUT 2 and modify the contents of receive FER probability register 66 on a packet-by-packet basis according to the parsing results, so as to provide for the effect of different consecutive packets appearing to be received from DUT 2 by WLAN tester 1 from different distances. Advantageously, this capability may be used to emulate multiple WLAN clients being located at different distances.

It is apparent that the teachings of the present invention enable the mobility performance of WLAN equipment to be measured in a simpler and more deterministic manner. It is further apparent that the teachings of the present invention enable the effective distance between a WLAN device and a WLAN tester to be simulated without incurring difficulties due to noise or manufacturing tolerances. It is yet further apparent that the teachings of the present invention enable the effective FER introduced into a WLAN link to be precisely controlled, in either transmit, receive, or both directions, without the use of RF attenuators.

Accordingly, while this invention has been described with reference to illustrative embodiments, this description is not intended to be construed in a limiting sense. Various modifications of the illustrative embodiments, as well as other embodiments of this invention, will be apparent to persons skilled in the art upon reference to this description without departing from the scope of the invention, which is defined solely by the claims appended hereto.

What is claimed is:

1. A test system for testing a wireless data communication device, comprising:
    a transmission datapath for transmitting wireless test data packets to said wireless data communication device;
    a reception datapath for receiving wireless test data packets from said wireless data communication device; and
    transmit error injection logic, within said transmission datapath, adapted to emulate the effects of spatial separation between said wireless data communication device and said test system by introducing controlled levels of impairment;
    wherein said impairment includes modifying a Frame Check Sequence in said transmitted wireless test data packets to increase a frame error ratio observed at said wireless data communication device.

2. The system of claim 1, wherein said transmit error injection logic corrupts said transmitted wireless test data packets at regular intervals, with the interval between corrupted packets being controlled.

3. The system of claim 1, wherein said transmit error injection logic corrupts said transmitted wireless test data packets at random intervals, with the overall probability of corruption being controlled.

4. The system of claim 1, further including the introduction of impairment by changing a power level of said transmitted wireless test data packets.

5. The system of claim 4, wherein said transmission datapath further includes an attenuator adapted to provide said change in power level.

6. The system of claim 5, wherein said attenuator is a digital step attenuator.

7. The system of claim 1, wherein said levels of impairment are modified on a packet-by-packet basis.

8. The system of claim 1, wherein said levels of impairment are dynamically modified to emulate the movement of WLAN devices.

9. A test system for testing a wireless data communication device, comprising:
    a transmission datapath for transmitting wireless test data packets to said wireless data communication device;
    a reception datapath for receiving wireless test data packets from said wireless data communication device; and
    receive error injection logic, within said test system, adapted to emulate the effects of spatial separation between said wireless data communication device and said test system by introducing controlled levels of impairment;
    wherein said receive error injection logic modifies a frame error ratio reported to said wireless data communication device, independently of an actual frame error ratio detected by said reception datapath.

10. The system of claim 9, wherein said levels of impairment are dynamically modified to emulate movement of WLAN devices.

11. The system of claim 9, wherein said reception datapath further includes receive error injection logic adapted to control said frame error ratio by withholding acknowledgements for said received wireless test data packets.

12. The system of claim 11, wherein said receive error injection logic withholds acknowledgements at regular intervals, with the number of received packets between said withholding of acknowledgements being controlled.

13. The system of claim 11, wherein said receive error injection logic withholds acknowledgements at random intervals, with the overall probability of said withholding of acknowledgements being controlled.

14. The system of claim 11, wherein a decision to withhold an acknowledgement is made on a packet-by-packet basis.

15. The system of claim 11, wherein a decision to withhold an acknowledgement is made according to the contents of said received wireless test data packets.

16. The system of claim 11, wherein said transmission datapath is further adapted to introduce controlled levels of impairment into said transmitted wireless test data packets to further emulate the effects of spatial separation between said wireless data communication device and said test system.

17. The system of claim 16 wherein the introduction of said levels of impairment into said transmitted wireless test data packets comprise increasing the frame error ratio of said transmitted wireless test data packets.

18. The system of claim 17, wherein said transmission datapath further includes transmit error injection logic adapted to increase said frame error ratio by deliberately corrupting said transmitted wireless test data packets prior to transmission.

19. The system of claim 18, wherein said transmit error injection logic modifies a Frame Check Sequence in said transmitted wireless test data packets.

20. The system of claim 18, wherein said transmit error injection logic corrupts said transmitted wireless test data packets at regular intervals, with the interval between corrupted packets being controlled.

21. The system of claim 18, wherein said transmit error injection logic corrupts said transmitted wireless test data packets at random intervals, with an overall probability of corruption being controlled.

22. The system of claim 16, wherein said impairments introduced into said transmitted wireless test data packets comprise decreasing the power of said transmitted wireless test data packets.

23. The system of claim 22, wherein said transmission datapath further comprises an attenuator adapted to provide said decrease in power.

24. The system of claim 23, wherein said attenuator is a digital step attenuator.

25. The system of claim 16, wherein said levels of impairments introduced into said transmitted wireless test data packets are modified on a packet-by-packet basis.

26. The system of claim 16, wherein said levels of impairments introduced into said transmitted wireless test data packets are dynamically modified to emulate the movement of WLAN devices.

27. A method for emulating the effects of spatial separation between a wireless data communication tester and a wireless data communication device, comprising:

transmitting wireless test data packets from said wireless data communications tester to said wireless data communications device;

receiving wireless test data packets by said wireless data communications tester from said wireless data communications device; and simulating controlled levels of receive impairment in said received wireless test data packets;

wherein said receive impairment includes modifying a frame error ratio reported to said wireless data communication device, independently of an actual frame error ratio.

28. The method of claim 27, further comprising simulating controlled levels of transmit impairment in said transmitted wireless test data packets.

29. The method of claim 28, wherein said transmit impairment is introduced by corrupting said transmitted wireless test data packets.

30. The method of claim 29, wherein said corruption of said transmitted wireless test data packets is accomplished by modifying a Frame Check Sequence of said transmitted wireless test data packets at regular intervals with a predetermined interval.

31. The method of claim 29, wherein said corruption of said transmitted wireless test data packets is accomplished by modifying the Frame Check Sequence of said transmitted wireless test data packets at random intervals with a predetermined probability.

32. The method of claim 28, wherein said transmit impairment is introduced by changing the power level of said transmitted wireless test data packets.

33. The method of claim 27, wherein said receive impairment is introduced by withholding acknowledgements for said received wireless test data packets at regular intervals with a predetermined interval.

34. The method of claim 27, wherein said receive impairment is introduced by withholding acknowledgements for said received wireless test data packets at random intervals with a predetermined probability.

* * * * *